(12) United States Patent
Vasudevan et al.

(10) Patent No.: US 8,751,447 B2
(45) Date of Patent: Jun. 10, 2014

(54) REPRESENTING ATTACHMENTS OF OBJECTS IN A COLLABORATION SYSTEM USING METADATA COPIES

(75) Inventors: Ramesh Vasudevan, Los Altos, CA (US); Pradeep Seetharam, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 364 days.

(21) Appl. No.: 12/500,556

(22) Filed: Jul. 9, 2009

(65) Prior Publication Data

US 2011/0010333 A1 Jan. 13, 2011

(51) Int. Cl.
*G06F 17/30* (2006.01)

(52) U.S. Cl.
USPC .......................................................... 707/626

(58) Field of Classification Search
USPC .......................................................... 707/626
See application file for complete search history.

(56) References Cited

U.S. PATENT DOCUMENTS

| | | | |
|---|---|---|---|
| 2004/0133589 A1* | 7/2004 | Kiessig et al. ................. | 707/102 |
| 2007/0124373 A1 | 5/2007 | Chatterjee et al. | |
| 2007/0124374 A1 | 5/2007 | Arun et al. | |
| 2007/0124375 A1 | 5/2007 | Vasudevan et al. | |
| 2008/0162551 A1 | 7/2008 | Geyer et al. | |

OTHER PUBLICATIONS

Entire Prosecution History of U.S. Appl. No. 12/500,550, filed Jul. 9, 2009 by Ramesh Vasudevan et al.
Entire Prosecution History of U.S. Appl. No. 12/500,561, filed Jul. 9, 2009 by Ramesh Vasudevan et al.
Oracle® Collaboration Suite, Concepts Guide, 10g Release 1 (10.1.2), B25491-03, Jul. 2006, pp. 1-106.
Oracle® Mobile Collaboration, Administrator's Guide, 10g Release 1 (10.1.2), B25478-02, Sep. 22, 2006, pp. 1-148.
Fabrega, F.J.T. et al. "Copy on Write", Nov. 1, 1995, pp. 29.
"Oracle® Beehive Concepts Release 1 (1.4)", part No. E13794-02, published Dec. 2008, pp. 114.
"The Beehive 1.4 Application Developers Guide", part No. E13800-01, published Sep. 2008, pp. 146.
Margaret Spencer Dixon "Tips for Using Microsoft Outlook to Manage Your "To-Do" Lists", Spencer Consulting, published 2006, pp. 1-3.
Microsoft Office Online, Microsoft Office Outlook, "Assign a color category to a calendar appointment", May 2009, pp. 1-2.

(Continued)

*Primary Examiner* — Khanh Pham
*Assistant Examiner* — Johnese Johnson
(74) *Attorney, Agent, or Firm* — Omkar K. Suryadevara; Silicon Valley Patent Group LLP

(57) ABSTRACT

A computer that is programmed with software attaches one object ("from-object") to another object ("to-object") by preparing a new duplicate of certain metadata in the from-object, without copying any content of the from-object. The new duplicate metadata is stored in memory for use in identifying the from-object and the to-object as being attached. If the from-object itself has any existing attachments, e.g. to a group of additional objects, there already exists a group of existing metadatas that form existing attachments between the from-object and the group of additional objects. In such a case, the computer still prepares, without content copying, a group of new metadatas to identify the relationship between a corresponding additional object and the from-object. Some embodiments also identify the to-object within each metadata in the group of new metadatas, thereby to identify a path of objects through which an additional object is accessible.

20 Claims, 8 Drawing Sheets

(56) References Cited

OTHER PUBLICATIONS

Microsoft Office Online, Microsoft Office Outlook, "Assign a color category to an email message", May 2009, pp. 1-3.
Microsoft Office Online, Microsoft Office Outlook, "Create a new color category", May 2009, pp. 1-2.
"Organizing Information with Outlook 2007 Categories" excerpted from "Outlook 2007 for Dummies", Feb. 21, 2008, pp. 1-3.
Using Outlook Calendar, believed to be prior to May 31, 2009, pp. 1-32.
Outlook Wise Tips & Tricks, Updating Outlook Categories for Multiple Items, believed to be Jun. 4, 2007, pp. 1-5.
Microsoft Outlook 2003: Sharing your calendar using Microsoft Exchange Server, Mar. 2009, pp. 1-4.
Microsoft Outlook 2003: Opening another user's shared calendar using Microsoft Exchange Server, Oct. 2008, pp. 1.
Office Action dated Oct. 13, 2011 in U.S. Appl. No. 12/500,550, pp. 9.
Amendment dated Jan. 13, 2012 in U.S. Appl. No. 12/500,550, pp. 14.
Final Office Action dated Jan. 31, 2012 in U.S. Appl. No. 12/500,550, pp. 13.
Office Action dated Oct. 13, 2011 in U.S. Appl. No. 12/500,561, pp. 10.
Amendment dated Jan. 13, 2012 in U.S. Appl. No. 12/500,561, pp. 13.
Final Office Action dated Feb. 3, 2012 in U.S. Appl. No. 12/500,561, pp. 13.
U.S. Appl. No. 12/500,550 pp. 41.
Applicant's Initiated Interview Summary dated May 30, 2012 in U.S. Appl. No. 12/500,550, pp. 3.
Amendment dated May 31, 2012 in U.S. Appl. No. 12/500,550, pp. 9.
U.S. Appl. No. 12/500,561, pp. 34.
Amendment dated Jun. 1, 2012 in U.S. Appl. No. 12/500,561, pp. 9.
Applicant's Initiated Interview Summary dated Jun. 6, 2012 in U.S. Appl. No. 12/500,561, pp. 3.
Office Action dated Nov. 19, 2013 in U.S. Appl. No. 12/500,561, pp. 11.
Office Action dated Nov. 19, 2013 in U.S. Appl. No. 12/500,550, pp. 11.
Amendment dated Feb. 16, 2014 in U.S. Appl. No. 12/500,550, pp. 10.
Amendment dated Feb. 17, 2014 in U.S. Appl. No. 12/500,561, pp. 12.

\* cited by examiner

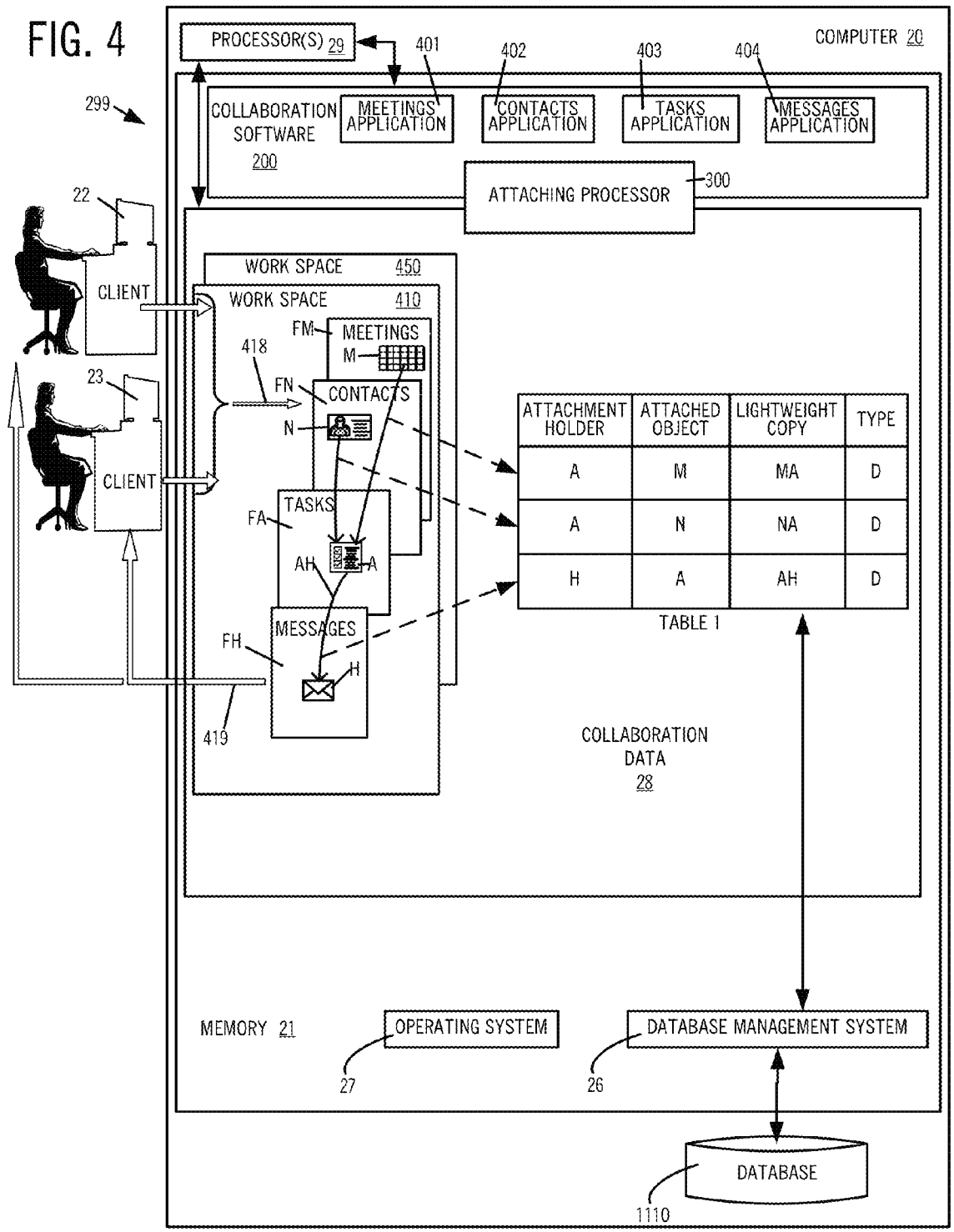

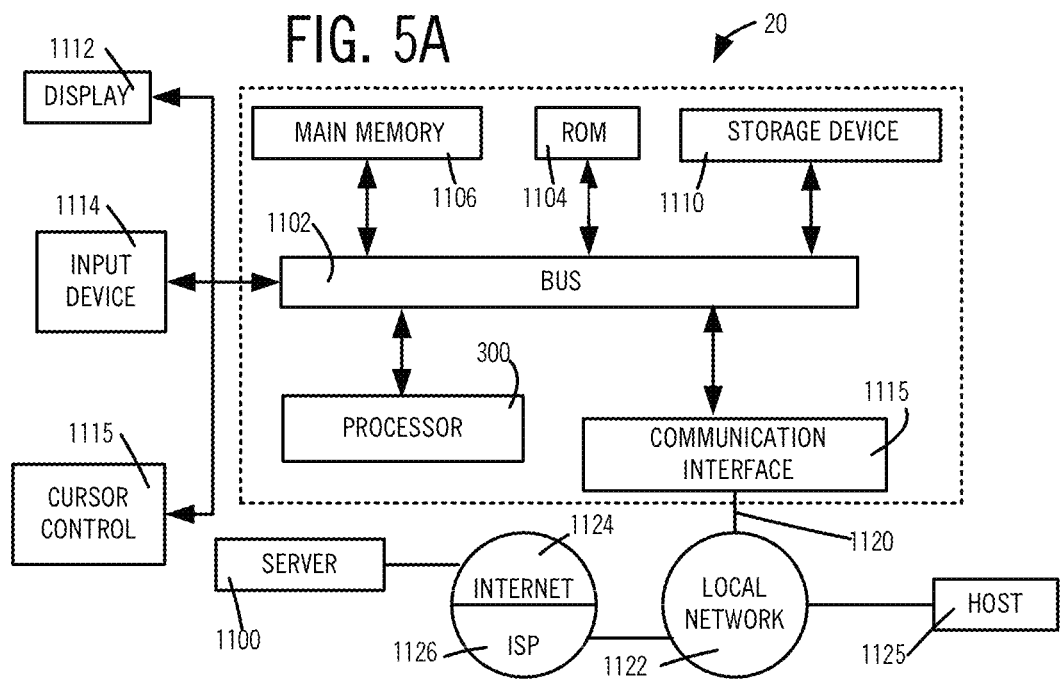
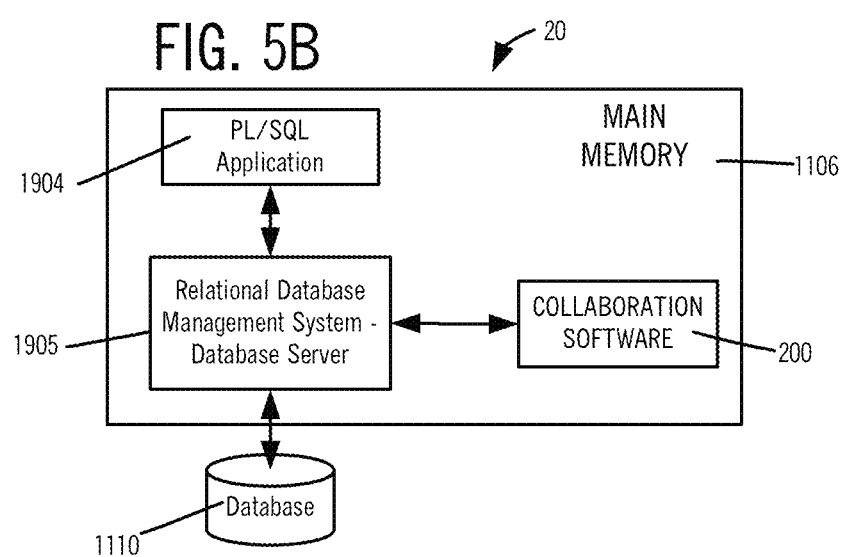

REPRESENTING ATTACHMENTS OF OBJECTS IN A COLLABORATION SYSTEM USING METADATA COPIES

CROSS-REFERENCE TO RELATED PATENT APPLICATIONS

This patent application is related to and incorporates by reference herein in their entirety the following two patent applications that are jointly owned and concurrently filed herewith:

(1) U.S. application Ser. No. 12/500,550, entitled "REPRESENTING AN OBJECT AS AN AGGREGATE OF IDENTIFIABLE PARTS SHAREABLE BY USERS OF A COLLABORATION SYSTEM" by Ramesh Vasudevan et al. and (2) U.S. application Ser. No. 12/500,561, entitled "SHARED STORAGE OF CATEGORIZATION, LABELING OR TAGGING OF OBJECTS IN A COLLABORATION SYSTEM" by Ramesh Vasudevan et al.

BACKGROUND

Computers that execute collaboration software are well known in the prior art, as illustrated, for example in FIGS. 1A-1C, and described in detail in US Patent Publication 2008/0162551 entitled "METHOD AND APPARATUS FOR PERSISTENT REAL-TIME COLLABORATION" by Geyer et al, published Jul. 3, 2008 which is incorporated by reference herein in its entirety as background.

Specifically, FIG. 1A attached hereto illustrates three client computers (at the top of the figure) connected via a network to a server computer (at the bottom of the figure). The server computer in FIG. 1A executes collaboration software to enable real-time conferencing and content management. The client computers (also called simply "client") use the server computer (also called simply "server") to share data and collaborate in real-time. The server allows fine grained sharing of any type of content using generic shared objects (GSO) of the type illustrated in FIG. 1B. The server manages relationships between shared objects; i.e., shared objects could be contained in other shared objects or reference other shared objects. As an example, the server might support hierarchical storage of shared objects similar to a file system.

The prior art server of FIG. 1A includes an access control logic that controls access to and modification of objects within an object database. Coupled to the access control logic is navigation logic which includes a relation database including data defining relationships between the various GSOs stored in the object database. Also coupled to access control logic is a broadcast interface that controls the broadcast of modifications to GSOs to identified interested clients, to facilitate synchronous conferencing between clients sharing objects.

A prior art GSO of FIG. 1B includes a set of general properties and a set of variable properties for content. General properties identify certain attributes of the object, without addressing the particular content of the object. General properties are generally populated by the server (FIG. 1A) when the object is created, and modified by the server in response to specific requests from the clients. Variable properties describe actual content of the data structure. Content is associated with a GSO by adding arbitrary numbers of content identifiers to the GSO. The content identifiers are shown in FIG. 1B as being represented by <name, value> pairs. For example, a GSO may have multiple <name,value> pairs with the same general name, thus defining an 'activity list' for the name. For example, a given GSO having a name of 'Design' could include one <name, value> pair defining a document to be modified and another <name, value> pair defining a chat session. Members in the access control list of 'Design' can simultaneously access the document and chat session to synchronously collaborate on the design. The value field is typically a text field but could optionally also support different data types, e.g. Integer, Boolean etc. In particular, a GSO supports binary content, i.e. the value field could be a large binary object. In general, the value field could support types similar to relational database systems.

As shown in FIG. 1B, associated with each variable property (activity, or item of information) is an access history used to track a member's access to the individual data item, or activity. The access history could take a variety of forms, including an ordered list of members having recent access, the types of the most recent access (modification or simply reading), etc. Also shown in FIG. 1B is an access list in the general properties of the GSO, which is used to manage a list of members having access to the object. Different members having different roles may access objects in different manners. For example, some members may have modify access, whereas some may only have read access. In addition, some members may have no access to particular variable properties in the activity list of the associated with the object.

The prior art server of FIG. 1B supports complex collaboration through the aggregation of GSOs into hierarchies, graphs, or other structures as illustrated in FIG. 1C. Thus, GSOs can have arbitrary pointers to other GSOs. Each GSO within such a structure can have different membership. FIG. 1A's server may provide functions to help manage membership within these structures; e.g. when adding to or removing members from a single GSO, the server might provide options to propagate this operation to related GSOs. Likewise, when adding a new GSO to an existing GSO, the server may support conventions such as: aggregating the member lists of both GSOs, inheriting the member list of the existing GSO, or allowing the member list of the new GSO to prevail.

Prior art collaboration systems may implement attachments between objects as follows: an object M is attached to another object A by storing a pointer 101 to-object M in a field of object A. The current inventors of the invention described below note that such a prior art attachment has several drawbacks. One drawback of such attachment is that any attribute change to-object M after attachment affects any usage of that same object M which predates the attachment. For example, a collaborator (e.g. client) who may have been explicitly denied access to-object M may now gain access via object A and pointer 101.

Hence the current inventors believe that there is a need for a method and apparatus of the type described below.

SUMMARY

A computer that is programmed with software in accordance with the invention attaches one object ("from-object") to another object ("to-object") by preparing a new duplicate of certain metadata in the from-object, without copying any content of the from-object. The new duplicate metadata is stored in memory for use in identifying the from-object and the to-object as being attached. If the from-object itself has any existing attachments, e.g. to a group of additional objects, there already exists a group of duplicate metadatas that form existing attachments between the from-object and the group of additional objects. In such a case, the computer prepares, without content copying, a new group of duplicate metadatas and stores them in memory to identify a corresponding additional object and the from-object. Some embodiments also identify the to-object within each metadata in the new group of duplicate metadatas, thereby to identify a path of objects through which an additional object is accessible.

BRIEF DESCRIPTION OF THE FIGURES

FIG. 4 illustrates, in a block diagram, a server representing an attachment of an object in a table (Table 1) in some embodiments of the invention.

FIGS. 5A and 5B illustrate, in block diagrams, hardware and software portions of a computer that performs the method illustrated in FIG. 2.

DETAILED DESCRIPTION

One or more computers are programmed in accordance with the invention to implement a particular machine which executes software to represent an attachment between objects that are shared among multiple users, by preparing and storing copies (i.e. "duplicates") of a portion of metadata in the objects but without copying any content in the objects. The newly-prepared metadata includes at least a pair of identifiers of the two objects being attached, so that the metadata can be used in future to identify the two objects.

Figure 1A:
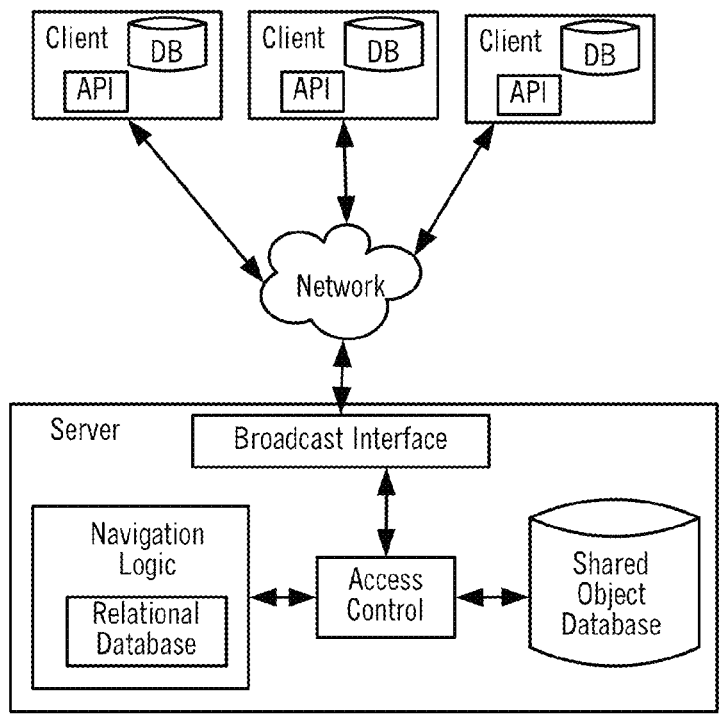
FIGS. 1A-1C illustrate of a collaboration system of the prior art described in US Patent Publication 2008/0162551.
Figure 1B:
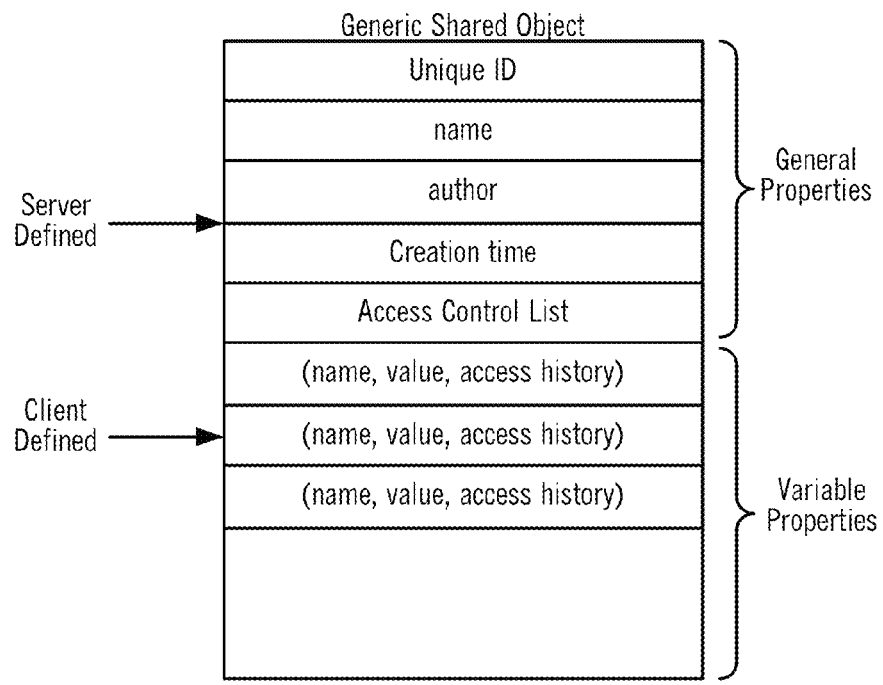
Figure 1C:
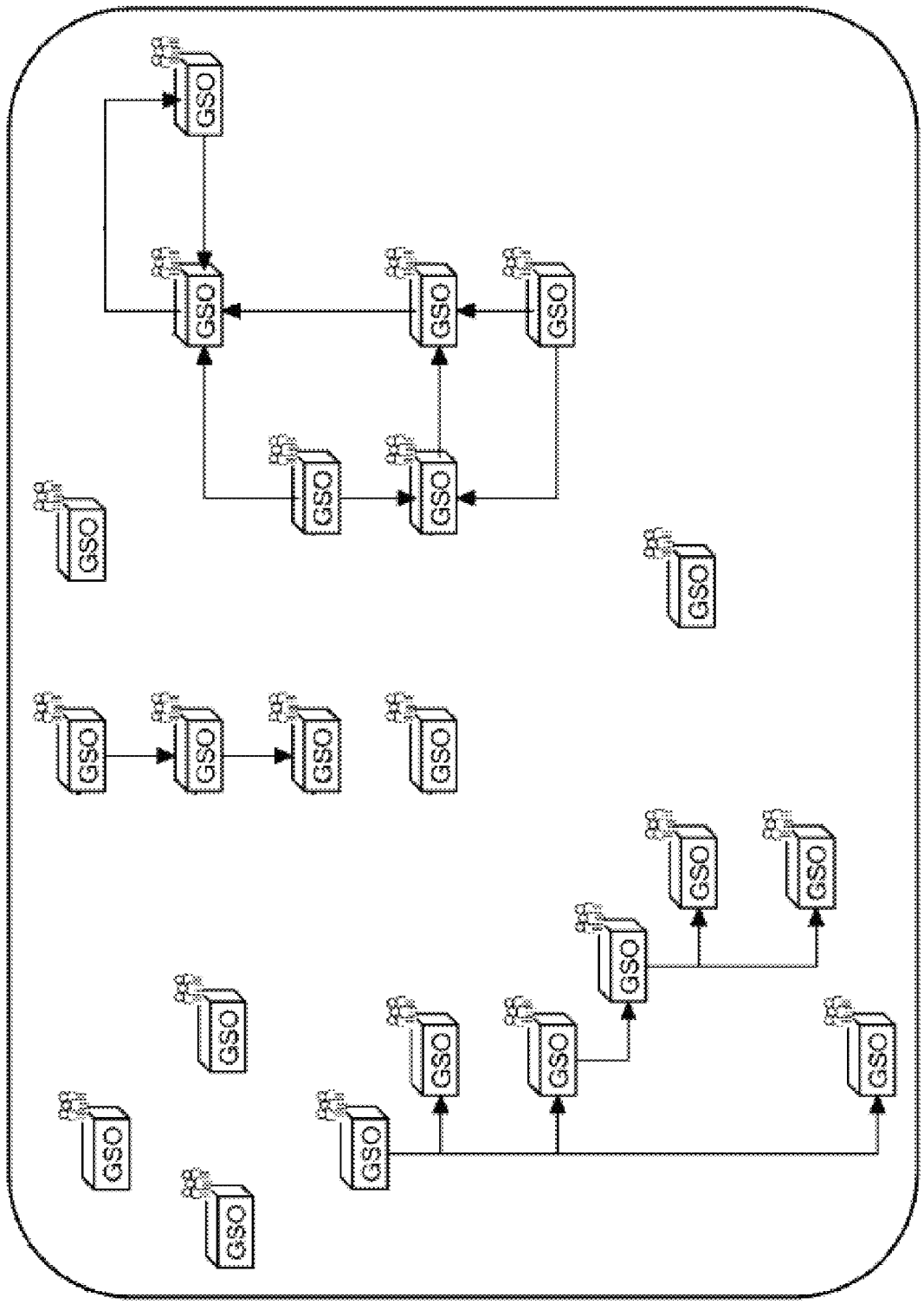
Figure 1D:
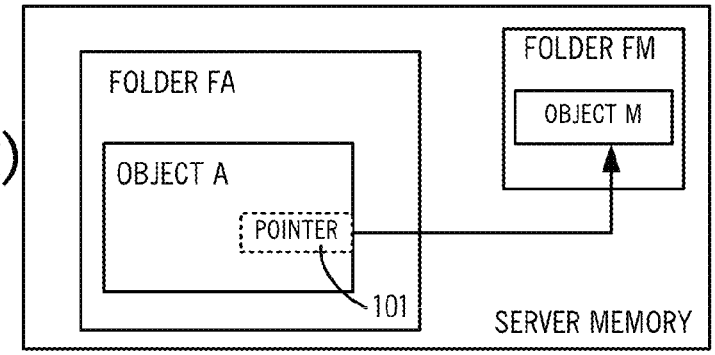
FIG. 1D illustrates, in a block diagram, attachment of an object M to an object A in as may be implemented in a server memory of the prior art.
Figure 2:
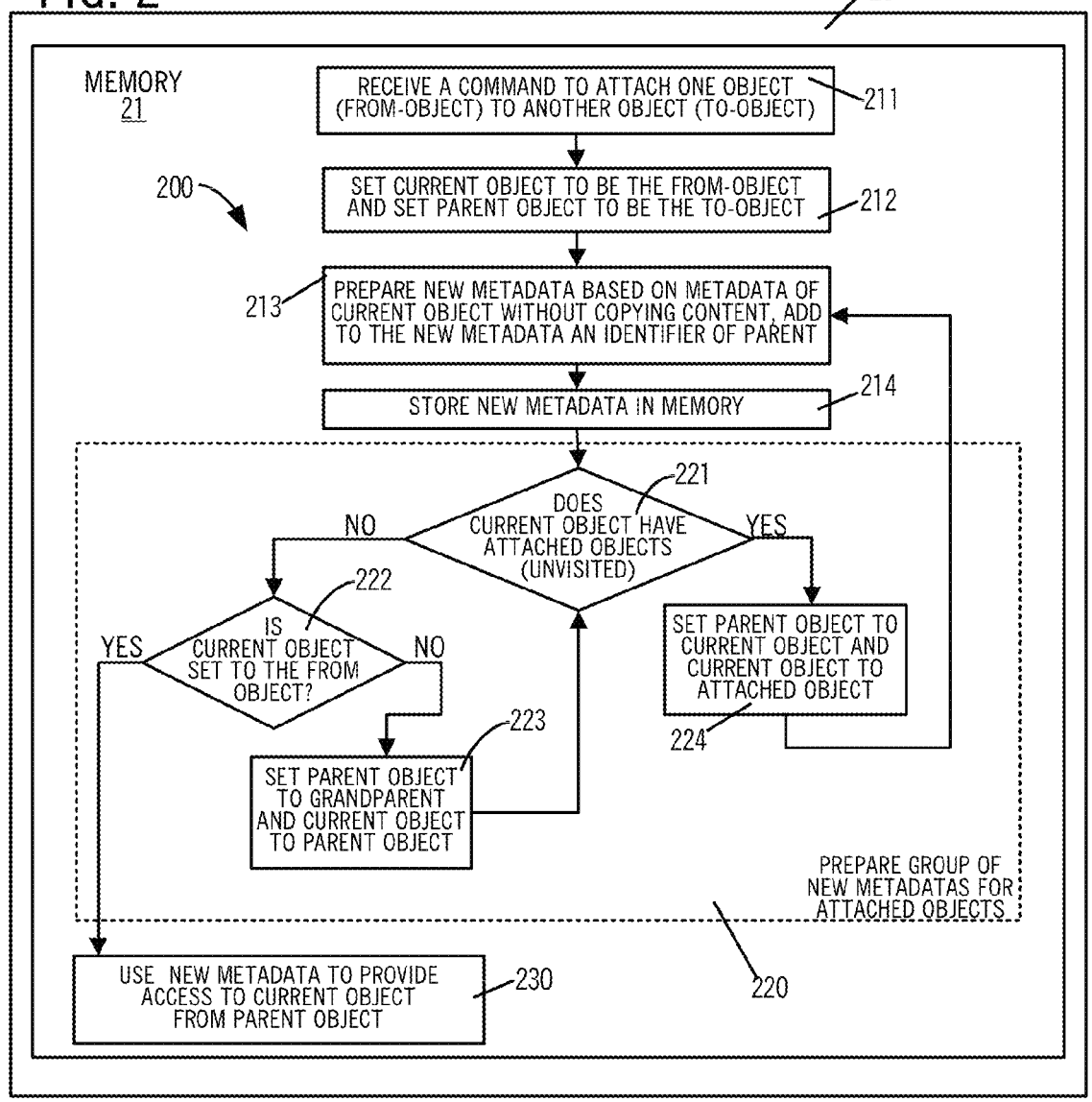
FIG. 2 illustrates, in a flow chart, a method performed by a server computer 20 that is included in a collaboration system of several embodiments of the invention.

Referring to FIG. 2, a computer 20 ("server") is specifically programmed, in some embodiments of the invention, to implement a particular machine which executes software 200 stored in memory 21, to represent in the memory 21, any attachment between two objects using metadata duplicates as described in the previous paragraph.

Specifically, in act 211 (FIG. 2) performed by execution of software 200, computer 20 receives a command ("attach command") to attach one object ("from-object') to another object ("to-object"). In response to receipt of the attach command, computer 20 goes to act 212 and sets a temporary variable for identifying a current object to be an identifier of the from-object, and further sets another temporary variable for identifying a parent object to be an identifier of the to-object.

Next, in act 213 (FIG. 2), computer 20 prepares new metadata based on a portion of metadata in the current object and does so without copying any content of the current object. The portion of metadata which is copied in act 213 from the current object to form the new metadata includes at least an identifier of the current object. Also in act 213, computer 20 includes in the newly-prepared metadata an identifier of the parent object e.g. in the form of a path to the parent object which has been traversed by a user ("first user") who issued the attach command (see act 211). Note that the path is implemented in some embodiments as a sequence of identifiers of objects in order of attachment.

The newly-prepared metadata at the end of act 213 is stored in memory as shown in FIG. 2 by act 214. The newly-prepared metadata is referred to below as a "lightweight" copy due to its lack of content. Note that an object's metadata portion which is copied in act 213 may include one or more attributes of the object, such as privileges and/or an identity of the creator, depending on the embodiment. One illustrative embodiment copies in act 213 certain privileges ("denies") of the current object which have been manually set to deny access to certain users. In several embodiments, in response to a command to attach an object, computer 20 prepares new metadata in the form of a lightweight copy for each new path to the object resulting from its new attachment.

If the current object does not have any other objects attached to itself, then the process of attaching is completed on performance of act 214, and the new lightweight copy is thereafter used by computer 20 to provide access to the from-object to any user who has access to the to-object, as shown by act 230 in FIG. 2. For example, a user ("second user") that has access to the to-object may issue another command ("identify command") to computer 20 to identify all objects attached thereto. Based on the newly-stored lightweight copy, computer 20 responds to the identify command from the second user by identifying the newly-attached from-object. The second user may then interact with computer 20 to use the from-object in the normal manner, e.g. retrieve and/or change content within the from-object.

If a group of one or more additional objects is attached to the current object, the current object is at the root of a tree. Due to a prior performance of the above-described acts 211-214, one or more lightweight copies already exist in memory 21 to represent attachment of the additional objects to the current object, even prior to receipt of the attach command in act 211. For example, if the tree with the current object as the root has a depth of one, i.e. no more objects exist that are attached to the additional objects themselves, in such cases there are as many lightweight copies in memory 21 as there are additional objects in the tree.

In addition to the group of existing lightweight copies in memory 21, in some embodiments computer 20 prepares a group of new lightweight copies to represent attachment of the additional objects to the parent object via the current object as follows. Specifically, in cases wherein tree depth is one, a new lightweight copy is created by computer 20 for each additional object e.g. by performing an operation 220 illustrated in FIG. 2 as a dotted box around acts 221-224. In operation 220, computer 20 may traverse a tree of any depth (i.e. not limited to depth of one) starting with the current object as root, in either a depth-first manner or a breadth-first manner depending on the embodiment. Further depending on the embodiment, operation 220 may be performed in an in-line manner in response to the attach command (received in act 211) or alternatively in an on-demand manner in response to a new command to access an attached object. Also, operation 220 may be performed in a recursive manner or alternatively in a loop, as will be readily apparent to the skilled artisan in view of this disclosure.

An illustrative implementation of operation 220 is now discussed in reference to FIG. 2 Specifically, after performing act 214 described above, computer 20 checks in act 221 whether the current object is attached to any additional objects that have not yet been visited in response to the attach command received in act 211. If the answer in act 221 is yes, then computer 20 goes to act 224 to set the temporary variable for identifying the parent object to be the identifier of the current object (e.g. same as the from-object), and further sets the temporary variable identifying the current object to be an identifier of the unvisited additional object identified in act 221. Thereafter, computer 20 transitions to act 213 followed by act 214 (both described above), to create a new lightweight copy based on metadata in the additional object.

In act 221, if the answer is no, then computer 20 goes to act 222 to check if the temporary variable identifying the current object is set to the from-object identified in the attach command received in act 211. If so, then computer 20 has completed operation 220 (i.e. the tree has been traversed), and computer 20 then transitions to act 230 (described above). In act 222 if the answer is no, then computer 20 goes to act 223 to set the temporary variable identifying the current object to its parent object, and further sets the temporary variable identifying the parent object to identify a grandparent object to which the parent object is attached, and then returns to act 221.

Figure 3A:
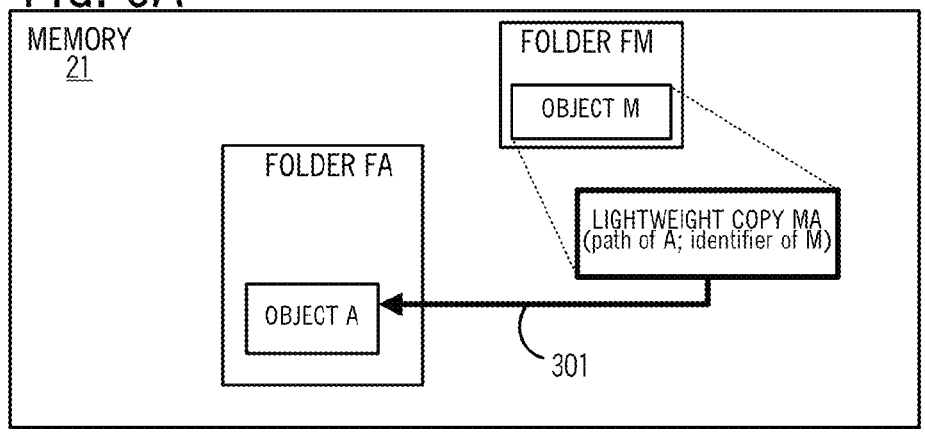
FIGS. 3A-3F respectively illustrate in block diagrams, successive states of memory including several metadata copies ("lightweight copies") of objects as they are attached, shown bolded in each figure.

Execution of the various acts of software 200 (FIG. 2) described above, is now discussed for an example illustrated in FIGS. 3A-3D. Specifically, FIG. 3A shows how an object M which is located in folder FM may be attached to another object A located in folder FA, by computer 20 preparing and storing in memory 21 a lightweight copy MA as per acts 213 and 214 described above. Lightweight copy MA includes at least an identifier of object M and also at least an identifier of object A. Changes in memory 21, on performance of acts 213-214 are illustrated in FIG. 3A with dark (i.e. heavy) lines. For example, the lightweight copy MA and the arrow 301 are added to memory 21, on performance of acts 213-214.

In some embodiments, the identifier of object A which is included in lightweight copy MA is stored therein as a portion of a path 301 (FIG. 3A) to-object A. The path 301 may be, for example, the specific path which was specified to computer 20 in the attach command, to identify object A. For example, if path 301 to-object A via folder FA is identified in the attach command, then that path 301 is also included in lightweight copy MA. Note that the term "folder" is used synonymously with a "directory." As object M is accessible through folder FM, object M and lightweight copy MA have different path identifiers.

In the example shown in FIG. 3A, no objects are attached to object M itself, hence a tree traversal as described above in reference to operation 220 is not performed at this stage. The presence of lightweight copy MA in memory 21 indicates to computer 20, the existence of an attachment between object M and object A. This attachment enables computer 20 to provide implicit access to object M to any user who has access to object A ("attachment holder"). So, any user who has access to object A prior to attachment now receives access to object M and all its attachments unless there are explicit access denies. Therefore, object M can now be accessed either through folder FM (primary access path) or by object A and getting all its attachments (secondary access path). In some embodiments, the identifier of each object also contains a path identifier, so that effectively, global object identifier=local object identifier+path identifier.

Figure 3B:
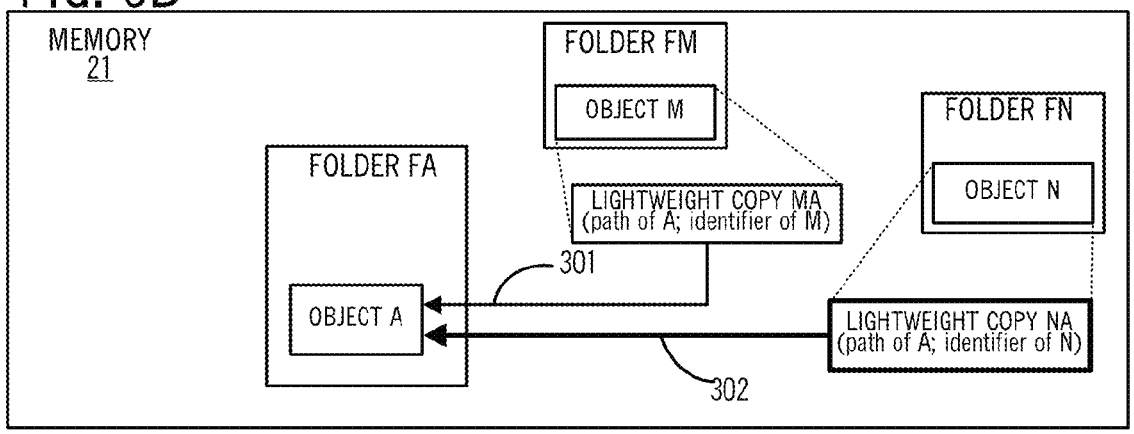

After object M is attached to object A, the user may issue a command to attach object N to object A, and computer 20 responds as discussed next. At this stage, object N located in folder FN (FIG. 3B) is identified in a command to attach it to object A. In response to this attach command, computer 20 again prepares and stores another lightweight copy NA, by performing acts 213 and 214. A new lightweight copy NA which is created at this stage by computer 20 includes a path 302 to object A, and the changes are highlighted in FIG. 3B with dark and heavy lines. Note that path 302 may be identical to path 301, depending on the arguments in respective attach commands for objects M and N. At this stage, as illustrated in FIG. 3B, object A has two attachments, namely object M and object N.

In some embodiments, each lightweight copy MA, NA has the same identifier as a corresponding object M, N from which metadata has been copied. Hence, although a lightweight copy MA, NA is not a physical copy of the corresponding object M, N, a portion of the metadata in an object M, N is copied over to form the corresponding lightweight copy MA, NA without copying any content. Accordingly, in such embodiments, a lightweight copy MA, NA and its corresponding object M, N have identical portions of metadata as well as the same identifier. In one such embodiment, the presence of a path helps computer 20 in identifying that an object is a lightweight copy and also in identifying through which path ("access path") an object is being accessed. Note that in an alternative embodiment, each object has a type field which has different values for content-containing objects and lightweight copies.

Figure 3C:
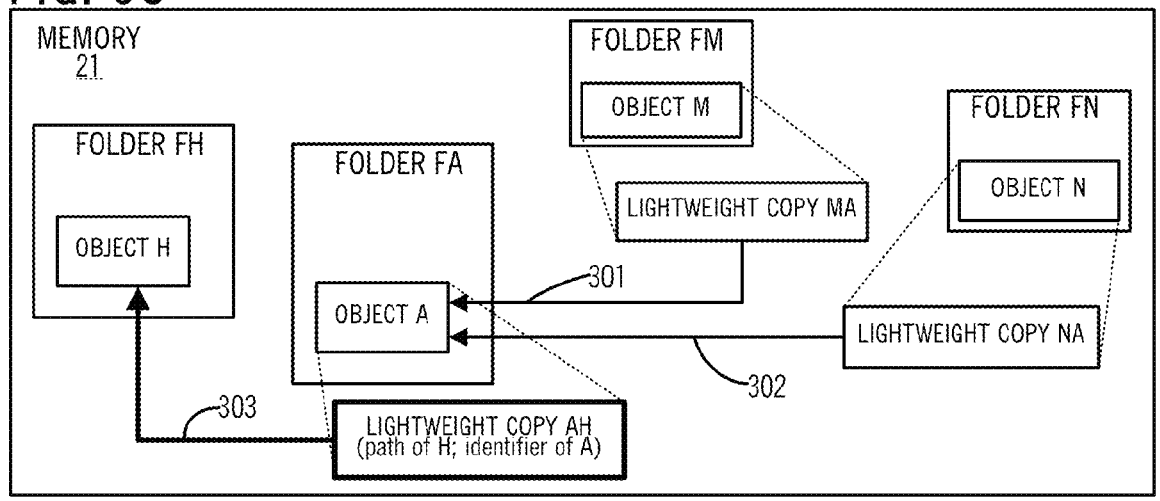

FIG. 3C illustrates preparation of a lightweight copy AH by computer 20 in response to a command to attach object A (which has as attachments, objects M and N), to an object H which is located in a folder FH. On receiving a command to attach object A to object H, computer 20 creates a lightweight copy AH based on the metadata of object A and identifies the parent object as object H, as highlighted in FIG. 3C with dark and heavy lines.

In some embodiments, operation 220 is not performed at this stage even though the from-object A has objects M and N attached to it. Instead, operation 220 is performed in these embodiments in an on-demand manner, in response to user access of attachments M and N of artifact A through artifact H. Specifically, in response to receipt of a command for user access, new lightweight copies MAH and NAH (FIG. 3D) are created, even though lightweight copies MA and NA already exist. Note that new lightweight copies MAH and NAH are attached to and identify the lightweight copy AH as their parent ("attachment holder"), while existing lightweight copies MA and NA are attached to and identify object A as their parent.

In an on-demand method of the type described above, lightweight copies of attachments of a from-object are not prepared immediately. Instead, lightweight copies of a from-object's attachments are created lazily, e.g. whenever someone tries to access the attachments, through a new path that includes the attachment between the to-object ("attachment holder") and the from-object ("attached object"). One advantage of the on-demand method is that it simplifies propagation of certain attributes such as access control lists (ACL) and/or privileges, and also reduces overhead when the attached object includes a tree (of attachments). Specifically, even without traversing an entire tree and updating metadata of each object in the tree when the tree's root is attached, software 200 of some embodiments ensures that any user who has access to the attachment holder (i.e. the "to-object") can access all its attachments on demand, regardless of tree depth, as long as there are no denies in privileges associated with objects being accessed.

Note that the above-described attachment of objects, as illustrated in FIGS. 2 and 3A-3D is also referred to herein as "attachment by reference" because no copies are made of content in the object being attached. Accordingly, when a from-object's content is changed, e.g. via a path through a folder containing the from-object, then it is the changed content which is supplied in response to an access to the from-object via another path ("attachment-containing path") through the to-object.

In addition to the above-described attachment by reference, some embodiments of computer 20 also support attachment by copy. In such embodiments, an attach command received by computer 20 specifies whether the attachment is to be by reference or by copy. If an attachment is to be made by copy, then computer 20 performs operation 220 in an in-line manner in response to the attach command. Specifically, computer 20 makes a lightweight copy of the from-object and also makes lightweight copies of additional objects that are attached to the from-object either directly or indirectly.

Figure 3D:
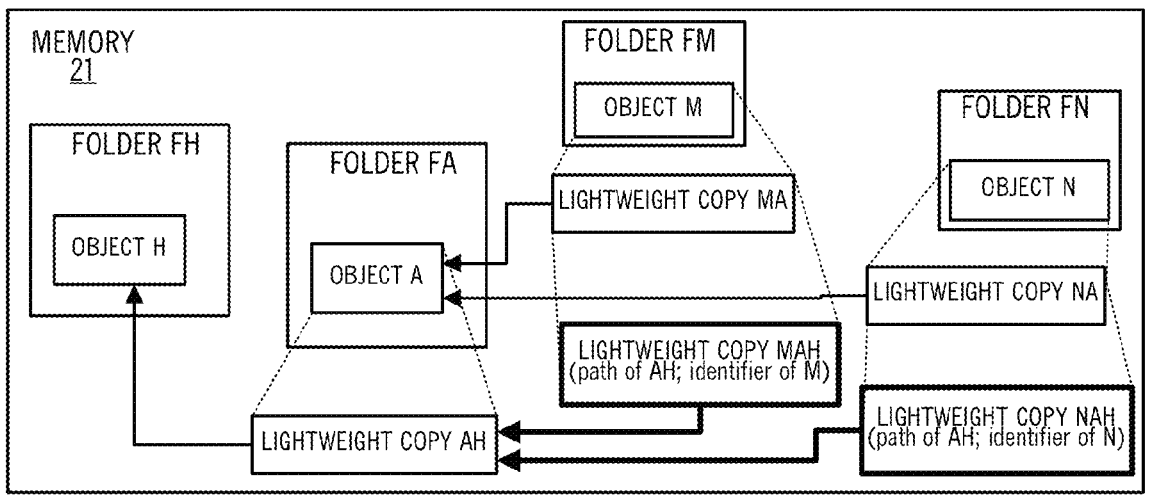
Figure 3E:
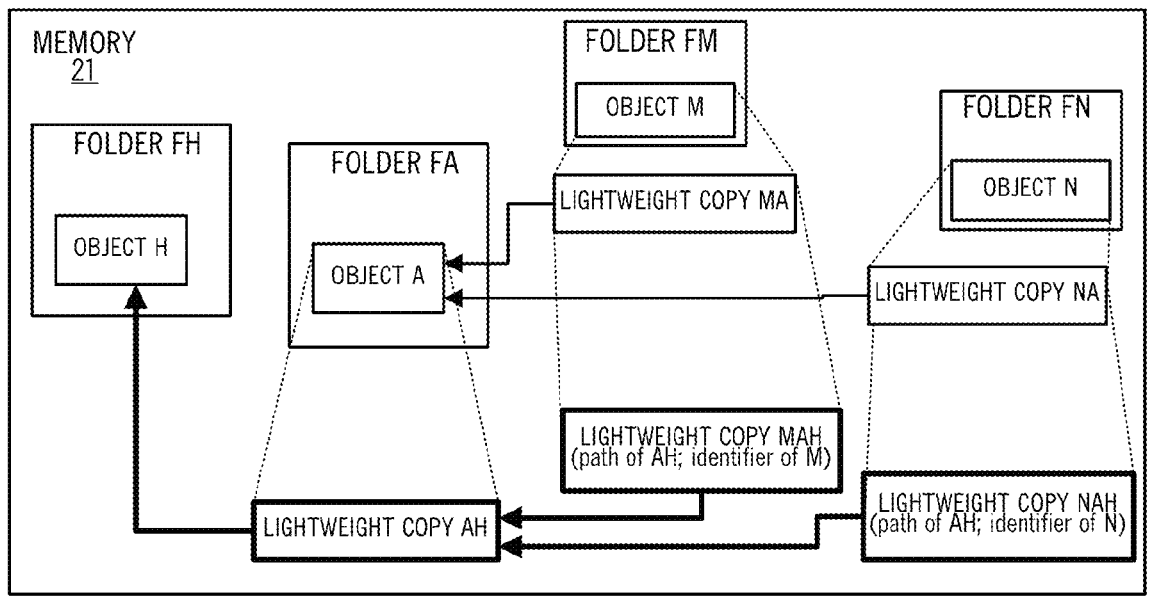
Figure 3F:
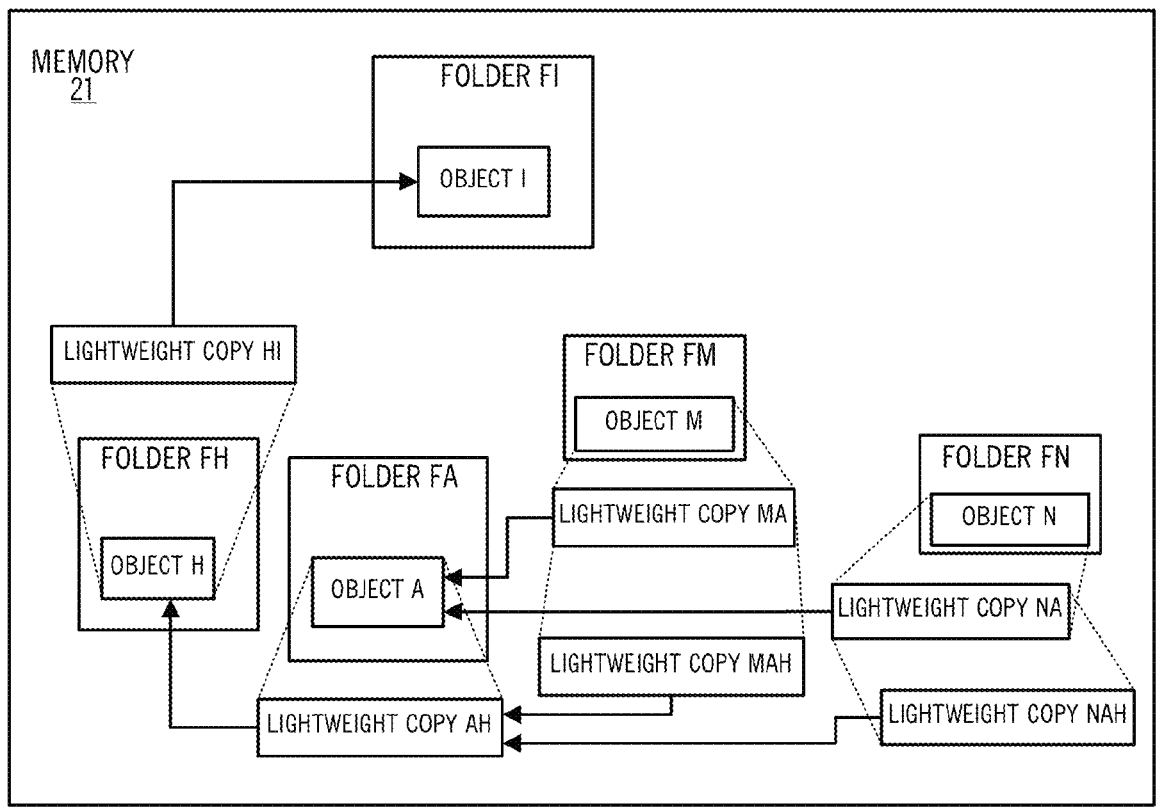

Hence, starting with the above-described example illustrated in FIG. 3C, if computer 20 receives an attach-by-copy command for object A and object H, then computer 20 creates a lightweight copy AH of object A as per act 213, and soon performs operation 220 without waiting for any further commands, to create lightweight copies MAH, NAH of all attachments MA, NA of object A, and also create lightweight copies of any attachments of the attachments MA, NA and so on, recursively down the tree. The results for this example are illustrated in FIG. 3E. Accordingly, on completion of operation 220, memory 21 has lightweight copies for each path through the from-object (e.g. each path through lightweight copy AH).

One difference between attaching by copy and attaching by reference is that computer 20 of some embodiments is programmed to create lightweight copies of metadata in from-object A and also of metadata of all additional objects that are attached to from-object A, and all other objects that are attached to the additional objects, recursively down the tree, which is done immediately without waiting for any further commands subsequent to the attach command. Such immediate creation of lightweight objects is performed by computer 20 in response to a command to attach by copy, because it is necessary for computer 20 to preserve the state of objects that are affected by attachment at this point in time, say T1. So, even if the metadata of from-object A happens to change at another time T2 subsequent to original time T1 of its attachment to the to-object H, computer 20 is able to determine the state of object A's attachments at time T1.

The above-described embodiments of computer 20 use a copy-on-write mechanism for any changes to an object A that are not related to attachments. Specifically, lightweight copies that are created as illustrated in FIGS. 3A-3D reference an original object A till the time it's edited. When original object A is edited, computer 20 makes a complete copy of object A (i.e. takes a "snapshot") before changing it (as per the edits), including all its metadata and all its content. After the complete copy is made, all lightweight copies in memory 21 that reference object A are updated to point to the complete copy.

Use of the just-described copy-on-write mechanism by computer 20 ensures that an object is not copied earlier than necessary. Even if an object is attached to multiple objects and/or lightweight copies, computer 20 creates only a single complete copy of that object and updates all references to point to the complete copy. Computer 20 maintains the complete copy of an object in memory 21 for as long as there is at least one reference to it. In addition, computer 20 is programmed in some embodiments to implement referential integrity semantics, wherein an attached object is deleted whenever its attachment holder (also called "parent") is deleted but only if the attachment holder is the only object that references the attached object.

In several embodiments in accordance with the invention, computer 20 does not support detaching an attached object along only one path (also called "access path"). For instance, object M in FIG. 3D cannot be de-attached from-object A only along the path FH→H→A→M but retained along the path FA→A→M. However computer 20 does support detaching object M from-object A in its entirety i.e. along all paths, whereby all lightweight copies of object M (e.g. lightweight copies MA, MAH) as well as for all the attachments starting at object M are deleted along all paths.

Computer 20 of some embodiment is programmed to use an access control list (ACL) to decide whether to execute a command received from a user U to access an object A, as follows. Specifically, computer 20 first checks the ACL of object A to identify a list of users who have access. If computer 20 finds that user U is explicitly given access or denied access, then the ACL evaluation ends, and computer 20 executes the command or returns an error code respectively. If computer 20 finds that there is no explicit indication of privileges for user U in the ACL of object A, evaluation moves up one level in a path to object A, e.g. to another ACL of folder FA where computer 20 repeats the same check. Accordingly, the ACL evaluation by computer 20 continues recursively up the hierarchy (of parent, grandparent, greatgrandparent, and so on up to a root folder) until an answer is obtained.

When the from-object A is attached to the to-object H, computer 20 executes all commands on the from-object A and all its attachments that are received from any user who has access to the to-object H. Accordingly, even if a user U does not originally have access to the from-object A, user U gains access to the from-object A if given access to the to-object H, provided there are no denies explicitly defined for the user U. Hence, attaching the from-object A to the to-object H has an effect of opening up access control on the from-object A to a new list of accessors via the to-object H.

Accordingly, in some embodiments of computer 20, a user U who issues a command to attach a from-object to a to-object is shown a warning message which states to user U that executing the attach command may open up access to the from-object and to any of its attachments to previously unauthorized users, and does user U still want to proceed with the attach command. On receipt of a positive answer from user U in response to the warning message, the attach command is executed by computer 20, in the above-described manner (see FIGS. 3C and 3D).

As attaching a from-object has the potential to open up access to the from-object, several embodiments of computer 20 implement support for a new privilege which can be used to control a user's ability to attach an object. Computer 20 ensures that only a user U who has been granted the new privilege (e.g. "ATTACH privilege") for object A can attach it to another object H, after being warned that the attachment may open up a new list of accessors to-object A.

In some embodiments, each lightweight copy is registered individually in an access control database in computer 20. In attaching by reference, all lightweight copies of an object A share the same denies as object A, e.g. in the ACL thereof. Other privileges, such as grants, are inherited from the respective to-objects of the lightweight copies (e.g. a lightweight copy AH inherits other privileges from to-object H). In case of attaching by copy, all lightweight copies of A which reference the same version of object A share the same denies as that version of object A.

In the just-described two cases, the denies of object A are effectively (but not necessarily actually) copied over, into each lightweight copy. Instead of making an actual copy of the denies at the time of making lightweight copies, at a later time computer 20 simply uses the denies of object A in checking privileges of a lightweight copy AH. Additionally, when a user U changes privileges on an object A, e.g. by explicitly specifying denies, computer 20 of some embodiments propagates the denies to all corresponding lightweight objects after obtaining approval for propagation from user U.

Computer 20 of some embodiments is programmed to maintain its lightweight copies in a table in a relational database. For example, on attaching object A to object H by reference, computer 20 creates a lightweight copy AH based on the metadata in object A, and set the parent of lightweight copy AH to be object H (instead of the folder FA) as shown in Table 1 below.

TABLE 1

After attaching object A to-object H by reference

| Attachment Holder (or to-object) | Attached Object (or from-object) | Lightweight copy | Type of attachment |
|---|---|---|---|
| A | M | MA | D |
| A | N | NA | D |
| H | A | AH | D |

The last column in Table 1 above indicates a type of attachment, e.g. a value D in this column denotes an attachment by reference, and value S in this column denotes an attachment by copy. Although not shown in Table 1 above, computer 20 of some embodiments additionally maintains in memory 21 additional information for each lightweight copy, such as a path through which the lightweight copy is accessible and/or an access control list.

The rows in Table 1 correspond to the metadata of lightweight copies which exist in memory 21 on attaching object A to object H, as illustrated in FIG. 3C. Specifically, the last row in Table 1 is shown bold to indicate that this row is added to the table on account of the just-described attaching. Note that the lightweight copies MA and NA of respective objects M and N already exist to identify the respective paths from-object A. Attaching object A to object H also creates new access paths to objects M and N from-object H but the corresponding new lightweight copies MAH and NAH are not created immediately at this stage. Instead, as noted above, lightweight copies MAH and NAH are created by computer 20 in an on-demand manner, when objects M and N are accessed from-object H as discussed next.

On computer 20 receiving a request from a user to supply the attachments of object H, e.g. through a call H.getAttachments( ), computer 20 checks the first column (entitled Attachment Holder) in Table 1 above, and finds that there is one row for object H, which is the last row in Table 1. However, instead of using the last row to identify and return attached object A from the second column, computer 20 instead returns an identifier of lightweight copy AH from the third column.

Thereafter, on receiving a command to supply metadata and/or content of lightweight copy AH, computer 20 checks an access control list (ACL) of lightweight copy AH. Note that in some embodiments the ACL of lightweight copy AH has explicit denies copied over from object A, so that a user who is denied access to object A is also denied access to lightweight copy AH. If a result of checking the ACL of lightweight copy AH is unresolved, computer 20 checks its parent which in this case is object H. Hence any user who has access to object H also has access to object A unless there are explicit denies.

On computer 20 receiving another request from the user to supply the attachments of lightweight copy AH, e.g. through a call AH.getAttachments( ) computer 20 responds in a similar to that described above. Specifically, computer 20 checks the Attachment Holder column of Table 1 and finds that there is no entry for AH. Then, computer 20 checks if there is an entry for lightweight copy AH in the third column and finds the third row. Computer 20 finds that the type of attachment (in the fourth column of Table 1) is identified as D, denoting an attachment by reference. Hence, computer 20 determines that at this stage lightweight copies of attachments to lightweight copy AH have not been generated yet. So, computer 20 uses the attached object A identified in the second column, last row to invoke function A.getAttachments, which returns lightweight copies MA and NA. Thereafter, computer 20 creates new lightweight copies MAH and NAH for respective paths through lightweight copy AH, by copying metadata portions from lightweight copies MA and NA. Next, computer 20 registers the new lightweight copies MAH and NAH in an access control database, with AH as the parent. Computer 20 also adds two rows to the above described Table 1, for the new lightweight copies MAH and NAH as shown below in Table 2. Note that computer 20 also, at this stage, returns the new lightweight copies MAH and NAH to the user.

TABLE 2

Access M and N through the access path starting from H

| Attachment Holder | Attached object | Lightweight copy | Type of attachment |
|---|---|---|---|
| A | M | MA | D |
| A | N | NA | D |
| H | A | AH | D |
| AH | M | MAH | D |
| AH | N | NAH | D |

The last two rows shown in bold in Table 2 above indicate the two rows added to the table on account of accessing objects M and N from object H. Table 2 corresponds to the data that is stored in memory 21 after the scenario in FIG. 3D is reached.

While the above-described rows being added to Tables 1 and 2 are for attaching an object by reference, the following description is for attaching an object by copy. Specifically, on attaching object A to object H by copy, computer 20 creates a lightweight copy AH based on metadata in object A, and set the parent of lightweight copy AH to be object H, instead of folder FA. Additionally, without any further commands, computer 20 also creates new lightweight copies for all attachments (e.g. M and N) by traversing a tree rooted at object A, and register the new lightweight copies in the access control database. Hence, at this stage, computer 20 creates lightweight copies MAH and NAH and registers lightweight copy AH as their parent in the access control database. Accordingly, three rows are added at this stage, as shown in Table 3.

TABLE 3

After attaching A to H by reference

| Attachment Holder | Attached object | Lightweight copy | Type of attachment |
|---|---|---|---|
| A | M | MA | D |
| A | N | NA | D |
| H | A | AH | S |
| AH | M | MAH | S |
| AH | N | NAH | S |

The last three rows in Table 3 above are shown in bold to indicate the data is newly added to the table on account of attaching object A to object H. Table 3 corresponds to the data that is stored after the scenario in FIG. 3E is reached.

Accessing and traversing objects that have been attached by copy is fairly straightforward as all the lightweight copies are created in an in-line manner in response to the attach command, i.e. without waiting for any further user commands. Specifically, in response to a command to retrieve attachments of object H through a call to H.getAttachments( ), computer 20 checks the Attachment Holder column in Table 3 and finds an entry for object H in the third row. But instead of returning object A from the second column, computer 20 returns an identifier of lightweight copy AH from the third column.

Thereafter, on receiving a command to supply metadata and/or content of lightweight copy AH, computer 20 checks an access control list (ACL) of lightweight copy AH (which has explicit denies copied over from object A). If the result of checking is unresolved at this stage, computer 20 checks its parent which in this case is registered as object H. Hence any user who has access to object H also has access to object A unless there are explicit denies. On trying to get the attachments of object A, a user's computer may send to computer 20, a call to AH.getAttachments( ). Computer 20 responds by checking the Attachment Holder column, and finds that there are couple of entries for lightweight copy AH. Hence, computer 20 uses the last two rows in Table 3 to return identifiers of lightweight copies MAH and NAH to the user.

An illustrative internal organization of computer 20 of several embodiments, is described below in reference to FIG. 4. Depending on the embodiment, computer 20 includes one or more processor(s) 29 and a memory 21 (FIG. 4). Processors 29 are dual core processors in CENTRINO DUO® available from Intel Corporation in some embodiments. Note that multiple processors are not a critical aspect of some embodiments, and alternative embodiments are implemented with a single processor 29 in computer 20 that is time-shared by multiple processes (of a collaboration system 299) in the normal manner. Collaboration system 299 is formed by computer 20 executing software 200 while using collaboration data 28. As will be readily apparent to the skilled artisan, one or more portions of software 200 and/or collaboration data 28 may be respectively executed by and/or stored in multiple computers that together form a collaboration system in a distributed processing environment.

Memory 21 (FIG. 4) of several embodiments ("first embodiments") includes, in addition to software 200 and independent therefrom, one or more portions of other software, such as database management software 26 and/or operating system software 27. Specifically, software 200 of several first embodiments uses one or more services normally provided by database management software 26 and/or operating system software 27. However, software 200 of certain first embodiments is implemented independent of database management software 26 and/or operating system software 27, depending on the embodiment.

Alternative embodiments of the invention extend other conventional software, e.g. extend database management (DBMS) software and/or operating system (OS) software by integrating therein one or more aspects of software 200. Hence, OS software 27 (FIG. 2) is itself extended in some alternative embodiments ("second embodiments") by implementing therein ("natively") one or more methods and/or data structures described herein, to support attaching objects that are shared by multiple users. As another example, DBMS software 26 (FIG. 4) is extended in certain alternative embodiments ("third embodiments") by implementing therein one or more methods and/or data structures described below to support attaching shared objects. Other embodiments extend both softwares 26 and 27 to implement methods and/or data structures of the type described herein.

In many embodiments of the invention, as illustrated in FIG. 4, software 200 in memory 21 includes, for example, a meetings application 401, a contacts application 402, a tasks application 403, and a messages application 404. The just-described applications 401-404 need not be included as portions of software 200, e.g. if these applications are supported natively by other software, such as such as database management software 26 and/or operating system software 27. Memory 21 also holds collaboration data 28 (such as Table 1) used by software 200 of several first embodiments, although as noted above such data 28 may be natively used by other software, such as such as database management software 26 and/or operating system software 27 in the second and third embodiments described above.

In some embodiments, data 28 defines one or more workspaces, such as workspaces 410 and 450, through which multiple users share all information related to the objects. For example, a workspace 410 is illustrated in FIG. 4 as receiving information via an input link 418 from client computers 22 and 23 that are connected to computer 20 via a network, such as the Internet. Computer 20 transmits information about one or more objects in workspace 410 to be displayed to the users of client computers 22 and 23 via an output link 419. The objects that are accessible through a workspace can be of any type, selected from among a number of predetermined types supported by software 200, such as a message type, a document type, a contact type, a task type, and a meeting type.

Unless otherwise described explicitly herein, workspaces 410 and 450 are implemented in a manner similar or identical to workspaces described in, for example, the following documents each of which is incorporated by reference herein in its entirety: United States Patent Application Publication 20070124373 by Ramkrishna Chatterjee et al. published May 31, 2007 and entitled "Methods and apparatus for defining a collaborative workspace"; United States Patent Application Publication 20070124374, by Arun Gopalan et al. published May 31, 2007, entitled "Methods and apparatus providing collaborative access to applications."

Referring to FIG. 4, workspace 410 includes several containers FH, FA, FM and FN through which objects in a server are accessible to clients. For example, information related to an object H is accessible to users of client computers 22 and 23 in a container FH in workspace 410 in server computer 20. In this example, object H is of type message, and container FH is also of type message, and a corresponding application, namely messages application 404, is used by computer 20 to interface with software in client computers 22 and 23 (e.g. email client software, such as MICROSOFT OUTLOOK available from Microsoft Corporation). As another example, another container FA in workspace 410 holds another object A of type task, and a tasks application 403 is used by computer 20 to interface with software in client computers 22 and 23 (e.g. tasks client software, such as MICROSOFT OUTLOOK available from Microsoft Corporation).

In some embodiments, applications 401-404, which are portions of software 200, are implemented in a manner similar or identical to software called "Oracle Beehive" as described in, for example, a paper entitled "Oracle® Beehive Concepts Release 1 (1.4)", part number E13794-02, published December 2008 and available from Oracle Corporation of Redwood Shores, Calif. The just-described paper is incorporated by reference herein in its entirety.

Many embodiments of computer 20 in accordance with the invention have several advantages compared to certain prior art, as follows. For example, in some embodiments of the invention, computer 20 uses a generic framework to model attachments between any set of objects in the system and the framework can be extended to handle new kinds of objects without any changes to the generic framework. In contrast, the current inventors note that certain existing prior art solutions provide only point solutions that handle specific kinds of objects only (e.g. attaching files to email messages). In certain embodiments of the invention, computer 20 provides support for modeling attachments by copy and by reference of objects in a graph, using dynamically created lightweight copies. In contrast, the current inventors note that some existing solutions of the prior art only provide support for static copy of content.

Some embodiments of computer 20 in accordance with this invention define a rich model for creating, capturing and traversing attachment graphs in a collaborative environment dealing with heterogeneous objects. A framework in computer 20 of such embodiments allows users to attach any type of object instead of limiting them to specific types of objects. Also, several embodiments form "live" attachments in response to a command to attach by reference, instead of creating static copies thereby to eliminate redundancy and keep the attachment information current. Hence, attaching by reference makes an attachment graph between objects easy to visualize and traverse and makes knowledge captured in memory 21 more productive by reducing clutter. Moreover, the current inventors note that dynamically creating a lightweight copy is faster and uses less memory than copying an entire object including its content.

Accordingly, the method of FIG. 2 may be used to program computer 20 of the type illustrated in FIG. 5A which is discussed next. Specifically, computer 20 includes a bus 1102 (FIG. 5A) or other communication mechanism for communicating information, and a processor 300 coupled with bus 1102 for processing information. Computer 20 uses as its memory 21 (FIG. 2) a main memory 1106 (FIG. 5A), such as a random access memory (RAM) or other dynamic storage device, coupled to bus 1102 for storing information and instructions (e.g. to perform the method of FIG. 2) to be executed by processor 300 (also called "attaching processor").

Main memory 1106 also may be used for storing temporary variables or other information (e.g. object A, object M, and lightweight copy MA as shown in FIG. 3A) during execution of instructions to be executed by processor 300. Computer 20 further includes a read only memory (ROM) 1104 or other static storage device coupled to bus 1102 for storing static information and instructions for processor 300, such as software 200. A storage device 1110, such as a magnetic disk or optical disk, is provided and coupled to bus 1102 for storing information and instructions.

Computer 20 may be coupled via bus 1102 to a display device or video monitor 1112 such as a cathode ray tube (CRT) or a liquid crystal display (LCD), for displaying information to a computer user, e.g. the content parts 231 and 251 may be displayed on display 1112. An input device 1114, including alphanumeric and other keys (e.g. of a keyboard), is coupled to bus 1102 for communicating information and attachments of objects A, M, N to attaching processor 300. Another type of user input device is cursor control 1116, such as a mouse, a trackball, or cursor direction keys for communicating information and command selections to processor 300 and for controlling cursor movement on display 1112. This input device typically has two degrees of freedom in two axes, a first axis (e.g., x) and a second axis (e.g., y), that allows the device to specify positions in a plane.

As described elsewhere herein, attachment of objects in a collaboration system 299 is performed by computer 20 in response to processor 300 (FIG. 5A) executing one or more sequences of one or more instructions for an attaching processor 300 (FIG. 4) that are contained in main memory 1106 (FIG. 5A). Such instructions may be read into main memory 1106 from another computer-readable storage medium, such as storage device 1110. Execution of the sequences of instructions contained in main memory 1106 causes processor 300 to perform the operations of a process described herein and illustrated in FIG. 2. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 300 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instead of or in addition to a storage medium, transmission link may be used to provide instructions to processor 300. A transmission link includes coaxial cables, copper wire and fiber optics, including the wires that comprise bus 1102. A transmission link can also take the form of acoustic or light waves, such as those generated during radio-wave and infrared data communications, any of which can be used to implement a carrier wave as described herein.

Accordingly, instructions to processor 300 can be provided by a transmission link or by a storage medium from which a computer can read information, such as data and/or code. Specifically, various forms of transmission link and/or storage medium may be involved in providing one or more sequences of one or more instructions to processor 300 for execution. For example, the instructions may initially be comprised in a storage device, such as a magnetic disk, of a remote computer. The remote computer can load the instructions into its dynamic memory (RAM) and send the instructions over a telephone line using a modem.

A modem local to computer 20 can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 300 retrieves and executes the instructions. The instructions received by main memory 1106 may optionally be stored on storage device 1110 either before or after execution by processor 300.

Computer 20 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer 20, are exemplary forms of carrier waves transporting the information.

Computer 20 can send messages and receive data, including program code, through the network(s), network link 1120 and communication interface 1115. In the Internet example, a server 1100 might transmit information related to objects H, A, M, N retrieved from a distributed database system through Internet 1124, ISP 1126, local network 1122 and communication interface 1115. The instructions for performing the operations of FIG. 2 may be executed by processor 300 as they are received, and/or stored in storage device 1110, or other non-volatile storage for later execution. In this manner, computer 20 may obtain the just-described instructions and any related data in the form of a carrier wave.

Note that FIG. 5A is a very low-level representation of many hardware components of a computer system. Several embodiments have one or more additional software components in main memory 1106 as shown in FIG. 5B. Specifically, in such embodiments, computer 20 of FIG. 5A implements a relational database management system 1905 of the type illustrated in FIG. 5B to implement DBMS 26 described above (FIG. 4). Relational database management system 1905 may manage a distributed database system that includes multiple databases, each database being stored on different storage devices and/or mechanisms, such as a hard disk.

In some embodiments, the multiple databases are made to appear to an application 1904 as a single database. In such embodiments, an application 1904 can access and modify the data in a database via a network that interconnects them. In other embodiments, an application 1904 interacts with only one database, e.g. database 1110. Database 1110 is controlled by a database management server (DBMS) 1905 which maintains overall consistency of data stored by database 1110. In several embodiments, the DBMS 1905 is responsive to commands (also called queries) from application 1904 and/or collaboration software 200 in conformance with a relational database language, the most common of which is the Structured Query Language (SQL). The commands are used by application 1904 of some embodiments to store, modify and retrieve data about objects H, A, M and N in the form of rows in tables (such as Table 1) in database 1110. The tables have one or more columns and zero or more rows as in a relational database that stores data in the form of tables related to one another.

Relational database management system 1905 further includes an output logic that makes objects H, A, M and N and any attachments therebetween available to a user via a graphical user interface that generates a graphical display of a tree of objects on a video monitor 1112. In one example, the output logic provides analysis results via a web-based user interface that depicts information related to metadata of a collaboration object and marks thereon any attachments to other collaboration objects. Additionally and/or alternatively, a database-centric screen is responsive to a command in a command-line interface and displays on a video monitor text information on attachments of one or more collaboration object(s).

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. One or more non-transitory computer-readable storage media comprising software to be executed to attach objects in a computer, the one or more non-transitory computer-readable storage media comprising:

a plurality of first instructions to receive a command to attach a second object in a second folder to a first object in a first folder, the second object having attached thereto a group of third objects;

wherein each of the first object, the second object and the third objects are comprised among a plurality of objects stored in a memory of the computer, each object in the plurality of objects comprising content and metadata, the metadata comprising an identifier of said each object;

wherein the first object comprises first metadata and first content, the second object comprises second metadata and second content, and each third object in said group comprises third metadata and third content;

a plurality of second instructions, responsive to receipt of the command, to prepare a new second metadata based on a portion of said second metadata in the second object without copying said second content of the second object, and to store in said memory, the new second metadata identifying at least the second object and further identifying a path to the first object traversed to issue the command to attach the second object, the path comprising a sequence of identifiers of objects in order of attachment;

wherein a group of existing third metadatas are present in said memory prior to receipt of said command, said group of existing third metadatas representing existing attachments between the second object and the group of third objects; and a plurality of third instructions to prepare another group of new third metadatas based on portions of the existing third metadatas in the third objects without copying content therein, and to store said another group of new third metadatas in said memory, each new third metadata in said another group identifying at least a third object and the second object.

2. The one or more non-transitory computer-readable storage media of claim 1 wherein the path is hereinafter a first path, and wherein:

each of said new third metadatas identifies a second path to a third object, the second path comprising said first path;

said third object is further accessible through a third path identified in an existing third metadata in said group of existing third metadatas, the third path comprising an identifier of the second folder containing said second object; and the one or more non-transitory computer-readable storage media further comprise a plurality of additional instructions, responsive to receipt of an additional command to access said third object, to check privileges associated with each object in a path selected to be one of said second path and said third path.

3. The one or more non-transitory computer-readable storage media of claim 1 wherein:

said plurality of third instructions are executed independent of receipt of an additional command to access one of said third objects.

4. The one or more non-transitory computer-readable storage media of claim 1 further comprising:

a plurality of fourth instructions, responsive to receipt of an additional command to access a selected one of said third objects, by invoking said plurality of third instructions to prepare a new group of duplicate metadatas;

wherein said plurality of third instructions are executed by said computer in an on-demand manner, in response to receipt of said additional command.

5. The one or more non-transitory computer-readable storage media of claim 4 wherein:

said plurality of fourth instructions are further responsive to preparation of said new group of duplicate metadatas, by invoking a plurality of fifth instructions to retrieve a duplicate metadata of said selected one of said third objects in said new group.

6. The one or more non-transitory computer-readable storage media of claim 5 wherein:

said plurality of fifth instructions check privileges associated with at least said selected one of said third objects, said second object and said first object.

7. The one or more non-transitory computer-readable storage media of claim 1 wherein:

the content of said each object in said plurality of objects is of a type selected from among predetermined types comprising a message type, a document type, a contact type, a meeting type and a task type.

8. The one or more non-transitory computer-readable storage media of claim 1 wherein:

each metadata in said new group of duplicate metadatas further identifies said first object.

9. A method for attaching objects in a computer, the method comprising:

receiving a command to attach a second object in a second folder to a first object in a first folder, the second object having attached thereto a group of third objects;

wherein each of the first object, the second object and the third objects are comprised among a plurality of objects stored in a memory of the computer, each object in the plurality of objects comprising content and metadata, the metadata comprising an identifier of said each object;

wherein the first object comprises first metadata and first content, the second object comprises second metadata and second content, and each third object in said group comprises third metadata and third content;

responsive to receipt of the command, preparing a new second metadata based on a portion of said second metadata in the second object without copying the second content of the second object, and storing in the memory, the new second metadata identifying at least the second object and further identifying a path to the first object traversed to issue the command to attach the second object, the path comprising a sequence of identifiers of objects in order of attachment;

wherein a group of existing third metadatas are present in the memory prior to receipt of the command, the group of existing third metadatas representing existing attachments between the second object and the group of third objects; and preparing another group of new third metadatas based on portions of the existing third metadatas in the third objects without copying content therein, and storing said another group of new third metadatas in the memory, each new third metadata in said another group identifying at least a third object and the second object.

10. A computer programmed with software to be executed to attach objects in, the computer comprising:

means for receiving a command to attach a second object in a second folder to a first object in a first folder, the second object having attached thereto a group of third objects;

wherein each of the first object, the second object and the third objects are comprised among a plurality of objects stored in a memory of the computer, each object in the plurality of objects comprising content and metadata, the metadata comprising an identifier of said each object;

wherein the first object comprises first metadata and first content, the second object comprises second metadata and second content, and each third object in said group comprises third metadata and third content;

means for preparing a new second metadata based on a portion of said second metadata in the second object without copying said second content of the second object, and for storing in said memory, the new second metadata identifying at least the second object and further identifying a path to the first object traversed to issue the command to attach the second object, the path comprising a sequence of identifiers of objects in order of attachment;

wherein a group of existing third metadatas are present in said memory prior to receipt of said command, said group of existing third metadatas representing existing attachments between the second object and the group of third objects; and means for preparing another group of new third metadatas based on portions of the existing third metadatas in the third objects without copying content therein, and for storing said another group of new third metadatas in said memory, each new third metadata in said another group identifying at least a third object and the second object.

11. The method of claim 9 wherein the path is hereinafter a first path, and wherein:

each of said new third metadatas identifies a second path to a third object, the second path comprising said first path;

said third object is further accessible through a third path identified in an existing third metadata in said group of existing third metadatas, the third path comprising an identifier of the second folder containing said second object; and the method further comprises responding to receipt of an additional command to access said third object, to check privileges associated with each object in a path selected to be one of said second path and said third path.

12. The method of claim 9 wherein:

said preparing another group of new third metadatas is executed independent of receipt of an additional command to access one of said third objects.

13. The method of claim 9 further comprising:

responding to receipt of an additional command to access a selected one of said third objects, by preparing a new group of duplicate metadatas.

14. The method of claim 13 further comprising:

responding to preparation of said new group of duplicate metadatas, by retrieving a duplicate metadata of said selected one of said third objects in said new group.

15. The method of claim 14 further comprising:

checking privileges associated with at least said selected one of said third objects, said second object and said first object.

16. The method of claim 9 wherein:

the content of said each object in said plurality of objects is of a type selected from among predetermined types comprising a message type, a document type, a contact type, a meeting type and a task type.

17. The method of claim 9 wherein:

each metadata in said new group of duplicate metadatas further identifies said first object.

18. The computer of claim 10 wherein the path is hereinafter a first path, and wherein:

each of said new third metadatas identifies a second path to a third object, the second path comprising said first path;

said third object is further accessible through a third path identified in an existing third metadata in said group of existing third metadatas, the third path comprising an identifier of the second folder containing said second object; and the computer further comprises means, responsive to receipt of an additional command to access said third object, for checking privileges associated with each object in a path selected to be one of said second path and said third path.

19. The computer of claim 10 further comprising:

means, responsive to receipt of an additional command to access a selected one of said third objects, for preparing a new group of duplicate metadatas.

20. The computer of claim 19 further comprising:

means, responsive to preparation of said new group of duplicate metadatas, for retrieving a duplicate metadata of said selected one of said third objects in said new group.

* * * * *

UNITED STATES PATENT AND TRADEMARK OFFICE
CERTIFICATE OF CORRECTION

PATENT NO. : 8,751,447 B2  Page 1 of 1
APPLICATION NO. : 12/500556
DATED : June 10, 2014
INVENTOR(S) : Vasudevan et al.

It is certified that error appears in the above-identified patent and that said Letters Patent is hereby corrected as shown below:

In The Specification

In column 1, line 36, delete ""client')" and insert -- "client") --, therefor.

In column 6, line 50, delete ""to-object')" and insert -- "to-object") --, therefor.

In column 7, line 57, delete ""parent')" and insert -- "parent") --, therefor.

Signed and Sealed this
Twenty-seventh Day of January, 2015

Michelle K. Lee
*Deputy Director of the United States Patent and Trademark Office*